United States Patent [19]

Leonard

[11] Patent Number: 5,142,990
[45] Date of Patent: Sep. 1, 1992

[54] SELF-PROPELLED AND ARTICULATED VEHICLE WITH TELESCOPIC JACKS TO CARRY PIPEWORK INSPECTION EQUIPMENT

[75] Inventor: Andre Leonard, Seichamps, France

[73] Assignee: Ecole Superieure des Sciences et Technologies de l'Ingenieur de Nancy (ESSTIN), Meurthe et Moselle, France

[21] Appl. No.: 713,709

[22] Filed: Jun. 11, 1991

[30] Foreign Application Priority Data

Jun. 11, 1990 [FR] France ............... 90 07383

[51] Int. Cl.⁵ .......................................... G01M 19/00
[52] U.S. Cl. .................................................. 104/138.2
[58] Field of Search ................ 104/138.1, 138.2; 105/3, 365; 378/60; 358/100; 33/302; 250/358.1; 15/104.05; 73/40.5 A, 592; 346/33 P; 352/131; 403/328, DIG. 6, 322

[56] References Cited

U.S. PATENT DOCUMENTS

| 4,289,414 | 9/1981 | Recker ................. | 403/328 |
| 4,464,077 | 8/1984 | Herchenbech et al. ...... | 403/328 |
| 4,616,952 | 10/1986 | Schott ................. | 403/328 |
| 4,645,372 | 2/1987 | Suzuki ................. | 403/328 |
| 4,677,865 | 7/1987 | Lehmann ............... | 104/138.2 |
| 4,770,105 | 9/1988 | Takagi et al. .......... | 104/138.2 |

FOREIGN PATENT DOCUMENTS

| 0085504 | 8/1983 | European Pat. Off. . | |
| 0181558 | 5/1986 | European Pat. Off. . | |
| 2640055 | 3/1978 | Fed. Rep. of Germany . | |
| 2172687 | 9/1973 | France . | |
| 2530214 | 12/1984 | France . | |
| 2638813 | 2/1991 | France . | |
| 0105839 | 6/1983 | Japan ................. | 358/100 |
| 0117463 | 5/1990 | Japan ................. | 358/100 |
| 0117464 | 5/1990 | Japan ................. | 104/138.2 |
| 0120168 | 5/1990 | Japan ................. | 104/138.1 |
| 0162153 | 6/1990 | Japan ................. | 104/138.2 |

OTHER PUBLICATIONS

R.F.M. Revue Francaise de Mecanique; No. 1987–4, Societe Française des Mecaniciens.

Primary Examiner—Matthew C. Graham
Assistant Examiner—Mark T. Le
Attorney, Agent, or Firm—Robert W. Becker & Associates

[57] ABSTRACT

The self-propelled vehicle intended to move in an essentially circular space has a central load-bearing structure made of frames placed in a longitudinal direction. Sets of jacks are arranged in transverse planes perpendicular to this direction and bear at their end a set of driving elements. Each jack has hollow rods of different diameters that are disposed concentrically about a longitudinal axis of the jack. These hollow rods are connected to one another and to the jack by a member for rotating the jack together with the hollow rods about the longitudinal axis.

20 Claims, 8 Drawing Sheets

SELF-PROPELLED AND ARTICULATED VEHICLE WITH TELESCOPIC JACKS TO CARRY PIPEWORK INSPECTION EQUIPMENT

TECHNICAL FIELD

The present invention relates to a self-propelled vehicle which can be used, in particuliar, to be moved in pipes to carry inspection equipment. This vehicle is designed for the use in various urban pipe systems such as sewers, water supply systems, drains, ventilation ducts, hollow brackets and pylons, but also in an industrial environment. It may carry tools and transport equipment to carry out simple work tasks with a specialized piece of equipment. It is designed to move over large distances while being connected to the outside by an umbilical line.

Vehicles which can move in spaces enclosed between substantially parallel walls and in tubes have already been designed. However, the known apparatuses occupy a large part of the spece in which they move and it is thus impossible for them to clear obstacles or changes in the geometry of the tubes such as pipe connections.

BACKGROUND OF THE INVENTION

The known vehicles, such as the autonomous carriage according to French Patent 2,172,687 and that cited in Revue Française de Mécanique 1987-4, move on wheels in the former and on metal belts in the latter. They are not self-steering and are guided by the tube walls. They can only overcome gentle slopes within the limit of their friction or adherence ensured by the weight of the apparatuses and an obstacle at the bottom of the tube prevents their advancing.

There is also known a climbing vehicle that is equipped with two driving wheels and four folding legs which ensure contact on the walls via spherical balls. With embodiments that are self-steering for avoiding certain obstacles. The spherical wheels make its progress impossible in tube portions which have significant roughnesses on the walls. Its traction capacity is limited to the friction or adherence of its two driving wheels, for six wheels in, contact and thus it cannot drag an umbilical line over a long distance.

The vehicle disclosed by French Patent 2,530,214 employs a module with two driving wheels and two wheels free in rotation to ensure adherence. It can steer itself, following the walls closely but, being close to the latter, it cannot avoid large obstacles such as sheaths. Furthermore, its adherence is limited to its two driving wheels and the vehicle is unstable. Actually, as soon as a wheel lost contact with the wall, the vehicle is unbalabnce. Also, its low adherence does not allow it to drag an umbilical line over distance.

The apparatus according to German Patent 26 40 055 is a manipulator employing assemblies of sets of three jacks to center itself, and not to ensure its adherence on the walls, since its wheels are not driving wheels. It is not a self-propelled vehicle, and it reaches its working position by gravity.

The vehicle according to European Patent Appliation Patent 0,181,558 moves by rolling along the bottom of tubes, ensuring its adherence by means of a set of wheels pushed by a jack. The position of its driving wheels does not allow it to steer itself in the tube in order to avoid obstacles. The arrangement of the mechanical elements forces the vehicle to maintain constant contact with all its wheels at the risk or rolling into a position which would cause it to lose its balance without permitting it to reestablish that balance.

The vehicle according to European Patent 0,085,504 moves by rolling along at the bottom of tubes, specifically pipelines. Held by three arms, it is substantially arranged concentric with the axis of the pipe by virtue of resilient arrangements. It is movable without being able to steer itself. The vehicle cannot circumvent a pipe connection or an obstacle.

The vehicle according to French Patent 2,638,813 is composed of a plurality of parts which can support each other in order to overcome an obstacle. It has sets of three telescopic screw jacks which allow it to be centered in the tube. However, its wheels are not directional wheels and, to overcome obstacles, it has to be carried by part of the other element. Its necessary robustness makes it heavy and it takes up a relatively significant space in the tube in relation to obstacles projecting into the tube. Its weight and the power necessary for operating the motors limit its operational range due to a voluminous umbilical line.

It is therefore an object of the present invention to eliminate these disadvantages, allowing the circumvention of obstacles and enabling the vehicle to travel long distances.

SUMMARY OF THE INVENTION

According to the principal feature of the vehicle of the present invention, the vehicle comprises a body equipped at the two ends with turrets carrying sets of jacks arranged radially to susbtantially ensure the vehicle's centering in a tube. The jacks of the single-acting type are actuated by gas and permit an adherence on the walls via devices which allow the displacement of the vehicle and are arranged on the end of the rod of each jack. The movement of the vehicle is thus ensured either by means of driving wheels or Caterpillars or endless belts. These elements for the traction of the vehicle are also steerable. They can turn simultaneously in groups comprising the front and rear sets in order to permit the steering of the vehicle.

According to another feature of this vehicle, the jacks are telescopic and can carry a plurality of rods nested one inside the other which are deployed over a variable length, thus permitting the vehicle to adapt to very different diameters in the course of a mission. Each of these rods has a rotatable linkage which allows the rotating movement of the body to be transmitted to each rod of the jack and to the cap of the rolling element, which is either a wheel or a Caterpillar or endless belt, to allow the vehicle to steer itself.

According to a preferred embodiment, the rotations of the jacks are controlled by a motor which rotates a central gear wheel which, meshing with pinons rigidly connected to the body of the jacks, can drive simultaneously in rotation the bodies of the jacks in the pivot link in the turrets. The jack assemblies for each turret are operated by an independent motor, thus allowing different directional rotations on the front and rear wheels of the vehicle.

According to another feature of this vehicle, the jacks are of the single-acting type, with a tension spring in the longidutinal axis of the jack for returning the jack rods towards the retracted position, whereby the spring is hooked to the bottom of the jack on the one hand and to the central rod on the other hand. The jacks are supplied with gas individually via a conduit penetrating at the base of the jack and via the interior of the body. The connecting means are connected to distributors which allow the jacks to be supplied with gas individually. The pressure of the gas opposes the return action of the spring, allowing partial extension of the jacks and different forces of pressure on the driving wheels on each leg.

According to another feature of the vehicle of the present invention, the turrets can be dismounted from the body of the jack. The vehicle can be equipped with turrets capable of receiving three jacks and with turrets capable of receiving four jacks. They are interchangeable on the body of the vehicle, depending on the missions chosen, by removing connecting screws.

According to another feature of this inventive vehicle, the jack bodies are nested in the rotating elements of the turrets. A ball catch ensures the linkage in translation of the body of the jack with the rotating part of the turret in which it is mounted. The linkage in rotation of the jack is ensured by a socket, the preferred embodiment of which is a prismatic connection. The ball catch is freed by effecting a manual translation on a ring returned by a spring. This device allows the jacks to be dismounted without a tool in order to facilitate the installation of the vehicle in narrow cavities such as manholes, for example.

According to another feature of the inventive vehicle, the turrets of the jacks can be equipped with all or some of their jacks. The empty spaces are filled-in by a cover mounted like the jacks and ensuring leakproofness in the opening. This arrangement allows a significant space to be freed on one side of the vehicle in order to allow obstacles hindering passage to be circumvented.

According to a preferred embodiment, the compressed gas supplied to the jacks is produced in a closed circuit. This arrangement allows the apparatus to move while immersed and independently of an air supply via the umbilical line.

According to another feature of the inventive vehicle, the wheels, each driven by a motor having a gear reducer, can be operated at different speeds. The reason for this arrangement is, in particular, to allow movements of the vehicle when the latter is supported solely by the wheels at one end; the jacks apply their forces to ensure a sufficient adherence solely via these wheels moved by their respective motors, while the other jacks have their rods retracted to allow a reduction of the space requirement of the vehicle and to allow movement to circumvent an obstacle.

This possibility of supplying the motors independently and even of cutting-off this supply allows manoeuvres for overcoming bends and obstacles. When it is rolling with four wheels on a plane surface, it is likewise possible to impart a rotation in a different direction for the wheels on each side of the vehicle so that the vehicle behaves like a tank, which slides and pivots on its rolling elements.

According to another feature of the vehicle which forms the object of the invention, each wheel is arranged to be guided in rotation on one side by a pivot connection likewise on the motor side. The wheels thus arranged allow the vehicle to roll on flat surfaces and resting on the pairs of wheels at the front on the one hand and at the rear, on the other hand, of the vehicle.

According to another feature of the vehicle which forms the object of the invention, the rolling element can be endless belts if the missions require it. The caterpillars are arranged to form an inclined plane in direction of advance of the vehicle and allow it to surmount obstacles substantially of the same difference in level as the inclined plane. The contact between the endless belt and the contact surface perpendicular to the axis of symmetry of the jack is defined by a curved surface given by the driving roller of the endless belt. This arrangement allows the extent of the surface of the endless belt in contact with the tube in the axis of the jack to be limited, facilitating the rotation of the jack about this axis. The rotation of each endless belt is ensured by a motor controlled independently and, according to a preferred embodiment, placed to the rear of the inclined plane. The rotary movement of the motor is transmitted to the driving roller of the endless belt by a belt. The endless belt has an intermediate roller device to allow it not to bend in the face of an obstacle. A tensioning device allows the endless belt to be tensioned.

According to another feature of the vehicle which forms the object of the invention, it is separated in its center into two parts connected by a motorized pivot. In its preferred embodiment, the articulation with its support means is rigidly connected to each half of the frame of the vehicle. A splined shaft of the pivot of the support means is linked in rotation with one element of the support means while the shaft is itself linked in rotation with the shaft of the motor; the motor being rigidly connected to the other part of the support means. The pivoting of the support means is thus subjected to the rotation of the motor associated with a gear reducer. The effort maintained by the motor associated wi a low output of the reducer allows the pivot and hence the body of the vehicle as a whole to be stiffened; conversely, the deactivation of the motor allows the pivot to be freed and permits free rotation.

According to another feature of the vehicle which forms the object of the invention, the latter is linked to a control station by an umbilical cord which carries cables for transmitting the electric power and control cables. According to a particular arrangement to permit displacements over long distances, the cable is wound up on a winder carried by the vehicle and likewise a winder outside the conduit in which the vehicle is situated.

To be able to move, the vehicle needs, inter alia, an observation facility provided by a camera which transmits the information to the control station via the umbilical cord. The camera makes it possible to follow the progress of the vehicle but also to make observations. The camera is moved by a mechanism which allows it to observe in the various directions of space. It is possible to mount other tools and control means on the vehicle.

BRIEF DESCRIPTION OF THE DRAWINGS

Other features and advantages of the invention will emerge from the following description, given purely by way of illustrative and in no way limitative example with reference to the attached drawings, in which.

DESCRIPTION OF PREFERRED EMBODIMENTS

Figure 1:
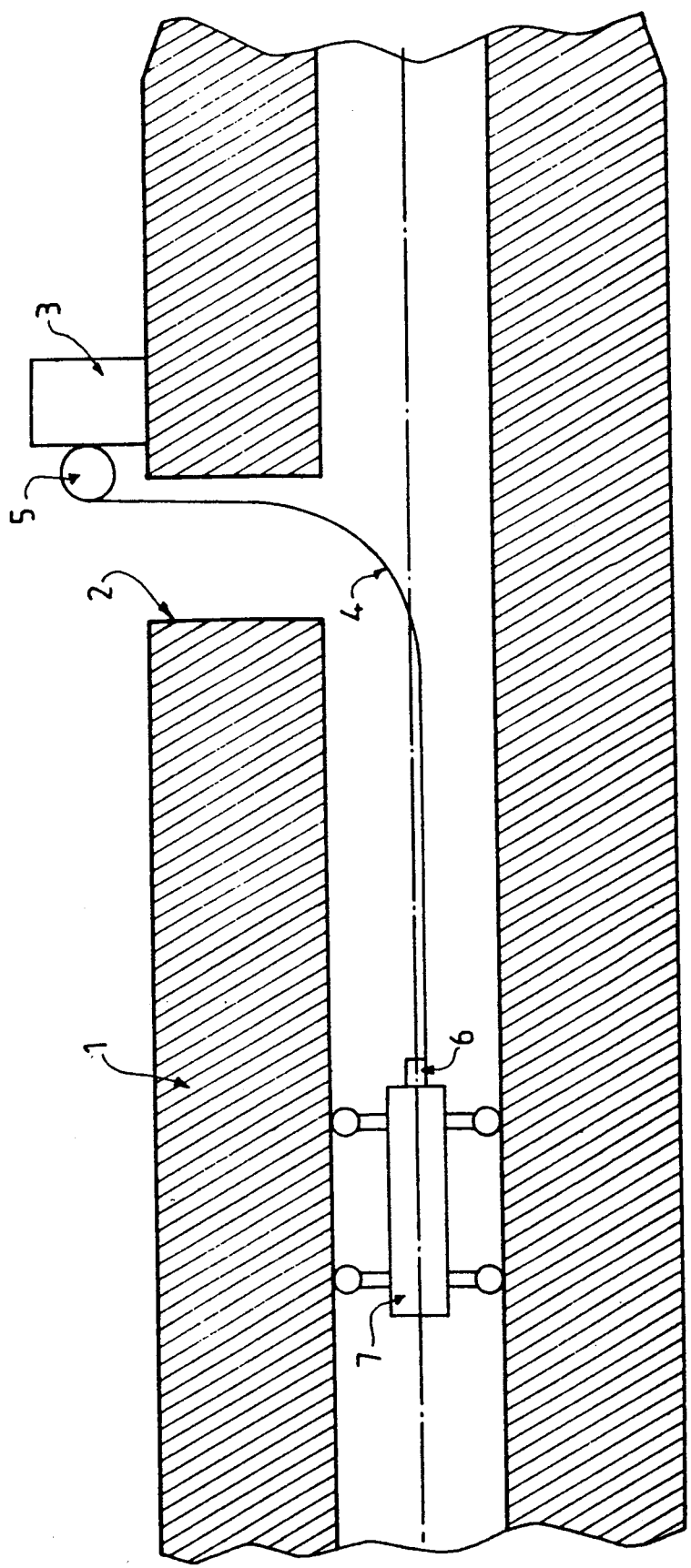
FIG. 1 is a diagram illustrating the general arrangement of the vehicle with its environment, arranged in a conduit, and its links with the outside.

FIG. 1 shows the vehicle in a conduit generally shown at 1 such as, for example, that of an urban pipe system. The apparatus has been introducec via an opening 2. A command and control device 3 is arranged outside the conduit and it is linked to the vehicle by an umbilical cord 4 which is unwound by a winder 5 as it progresses in the cavity. Carried along on the vehicle 7 is a second winder 6 which has a certain capacity of umbilical cord which it carries along. Over a first part of its progress, the vehicle pulls behind it the umbilical cord which the winder 5 unwinds. The umbilical cord is pulled by the vehicle, which rolls in the tube with a large traction capacity by virtue of the arrangement of its rolling elements as described below and likewise by virtue of the adherence which is given by the supplementary weight of the cable carried along, particularly in the horizontal lengths. When the resistance to the forward movement of the umbilical cord makes it necessary, the winder 6 unwinds the umbilical cord without pulling it. Upon the return of the vehicle, its mission having been accomplished, the umbilical cord will be essentially wound up by the winder 5 and, when this is impossible, wound by up the winder 6 as it progresses.

Figure 2:
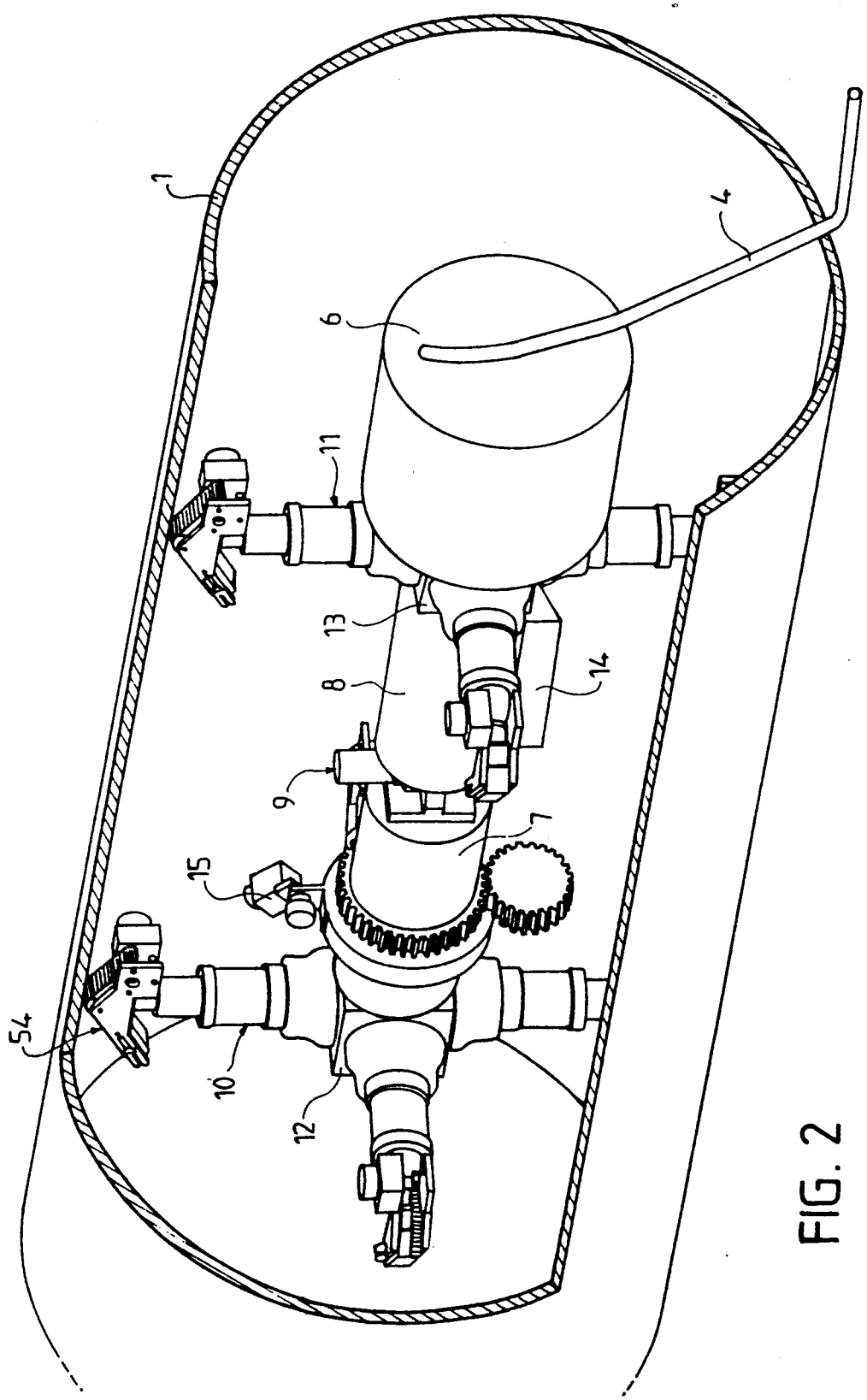
FIG. 2 is a perspective view of the vehicle in a tube.
Figure 4:
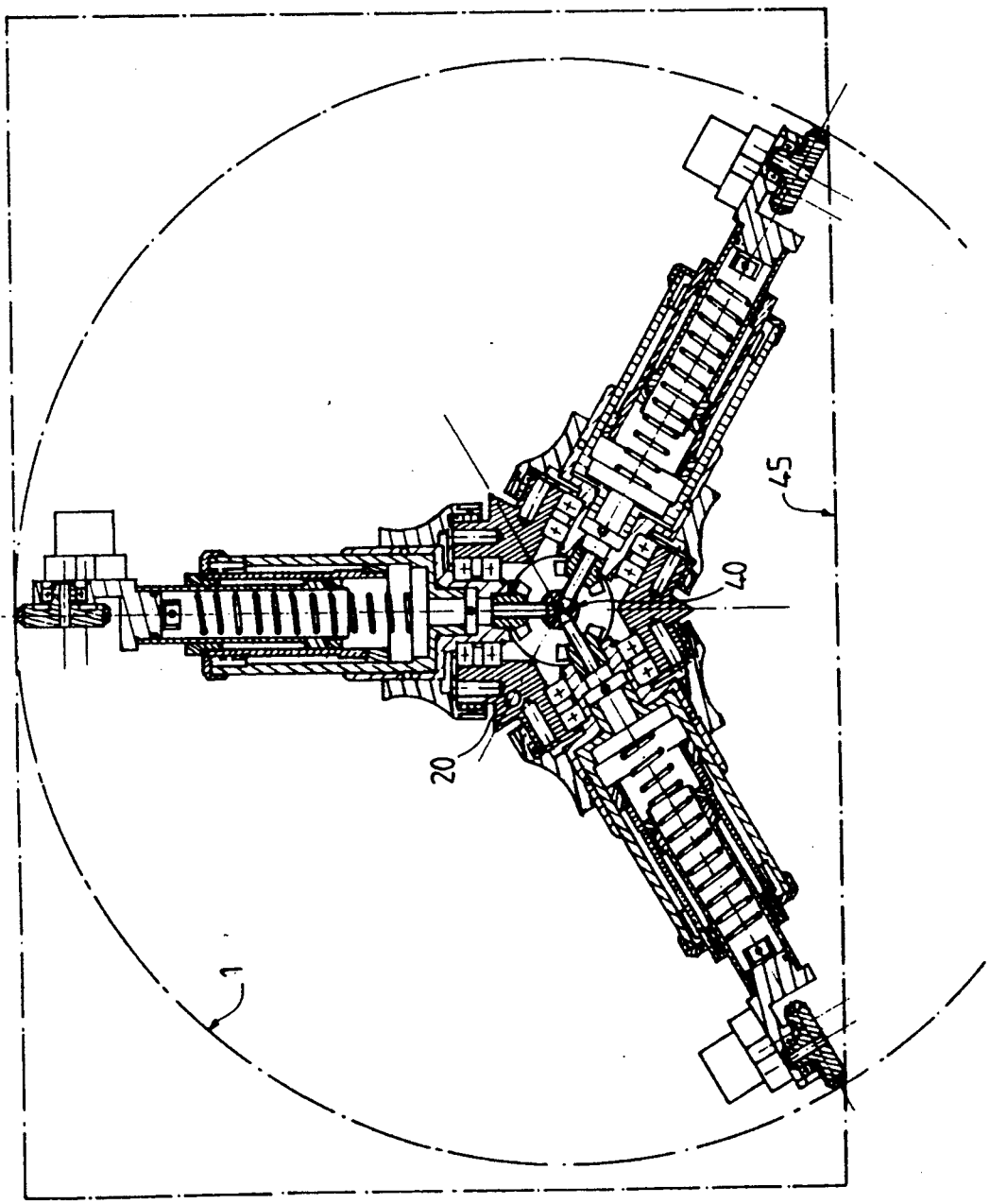
FIG. 4 is a cross-section of the body of the vehicle through the turret, showing an arrangement with three jacks and wheels arranged in a circular tube, and likewise in a rectangular channel, rolling on a plane, with the jacks partially deployed.

FIG. 2 shows the vehicle proper in a tube. The vehicle is composed of two frame parts 7 and 8 forming the body of the device. Placed between these two frame parts is a motorized pivot 9 actuated by a geared motor. The axis of the pivot in which the geared motor is situated is parallel to the axes of two jacks 10 and 11, one of which is arranged at the front and the other at the rear of the vehicle via a respective turret 12 at the front of the vehicle and a respective turret 13 at the rear. These turrets are provided in two embodiments, which are mutually interchangeable on the vehicle. In one embodiment three cavities, as shown by FIG. 4, are provided to allow the mounting of sets of three jacks, each that form two sets of three columns or legs to carry the vehicle in the tube. The other turret embodiment has four cavities, as shown by FIG. 2, to permit the mounting of four jacks each arranged in such a way that the jacks are arranged opposite one another in pairs opposed on the same axis so that four jacks, one pair at the front and one pair at the rear, are in the same plane and the other four are in a plane perpendicular to the first plane. The central pivot 9 is placed in one of the planes of the respective four jacks. This advantageous arrangement allows the vehicle to fold about its central pivot by turning about an axis formed by two jacks in frictional engagement with the tube, either the axis of the column formed by the two front jacks or the axis formed by the two rear jacks pressed onto the walls of the tube; in order not to impede the movements, the other jacks can be retracted as will be described below.

FIG. 2 likewise shows the winder 6 for the umbilical cord 4, fixed to the rear turret 13. Likewise, fixed on the frame part 8 of the body is the compressor set 14 supplying the gas to the jacks. The observation mechanism for the camera 15 is fixed on the frame part 7, allowing observations, as will be described below, between the legs of the vehicle both at the front and at the rear, so as to follow the progress of the vehicle but also to carry out observations of the environment which exploring is the task of the vehicle.

Figure 3:
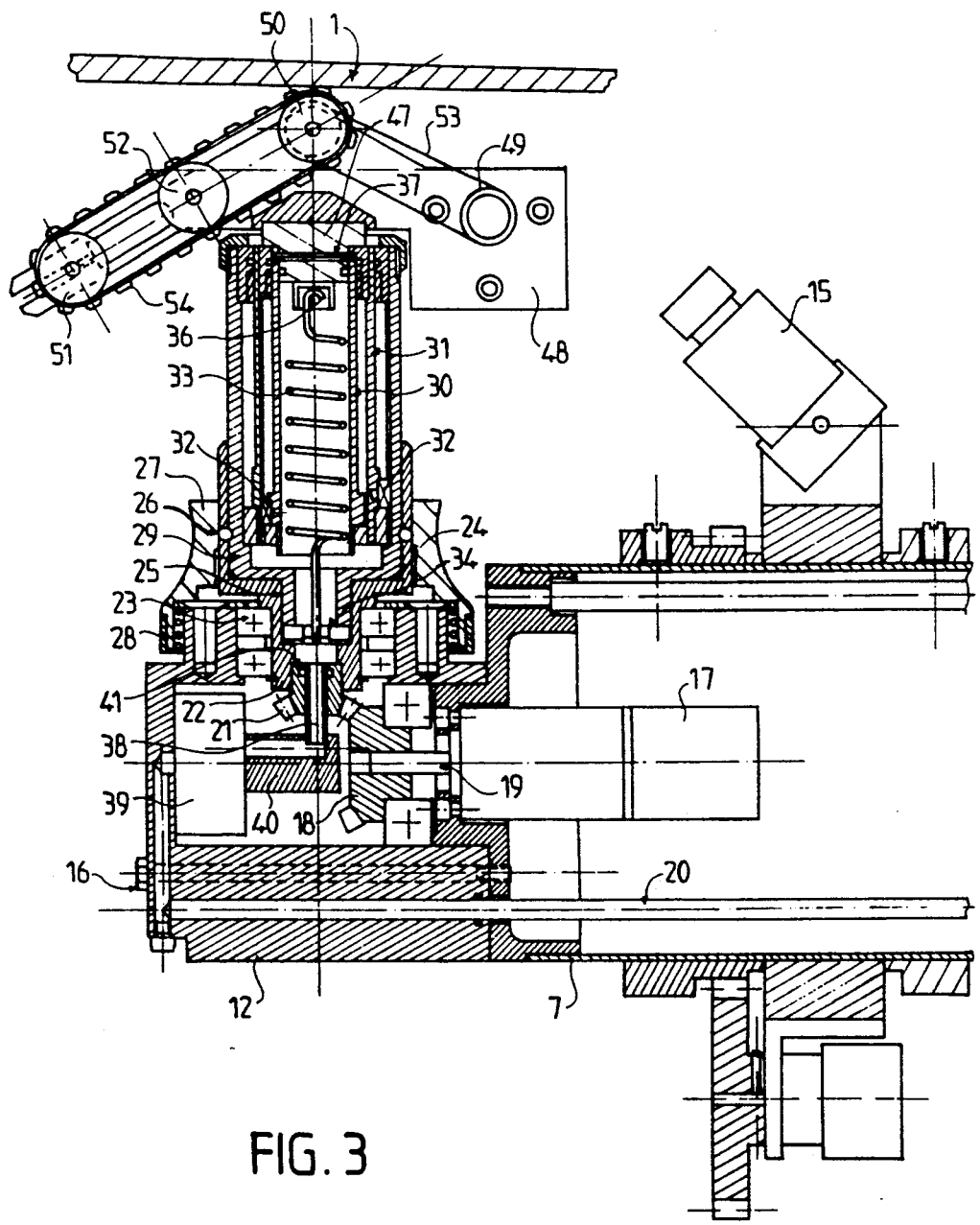
FIG. 3 is a longitudinal cross-section of the front part of the vehicle with an endless belt as driving element and the device for observation by camera.

FIG. 3 is a longitudinal cross-section of the front part of the vehicle. The turret 12 is fixed by screws 16 to the frame 7, allowing rapid dissassembly in order, for example, to allow another turret for either three or four legs to be put in place. The parts connected to the frame 7 are: the geared motor 17 and its bevel gearing 18 rigidly connected to the output shaft 19 of the geared motor 17. They are used for and common to the arrangements with four or three jacks. The air supply 20 coming from the gas supply set for the jacks open into the turret via an opening on which is leakproof with respect to the two turret arrangements.

Figure 6:
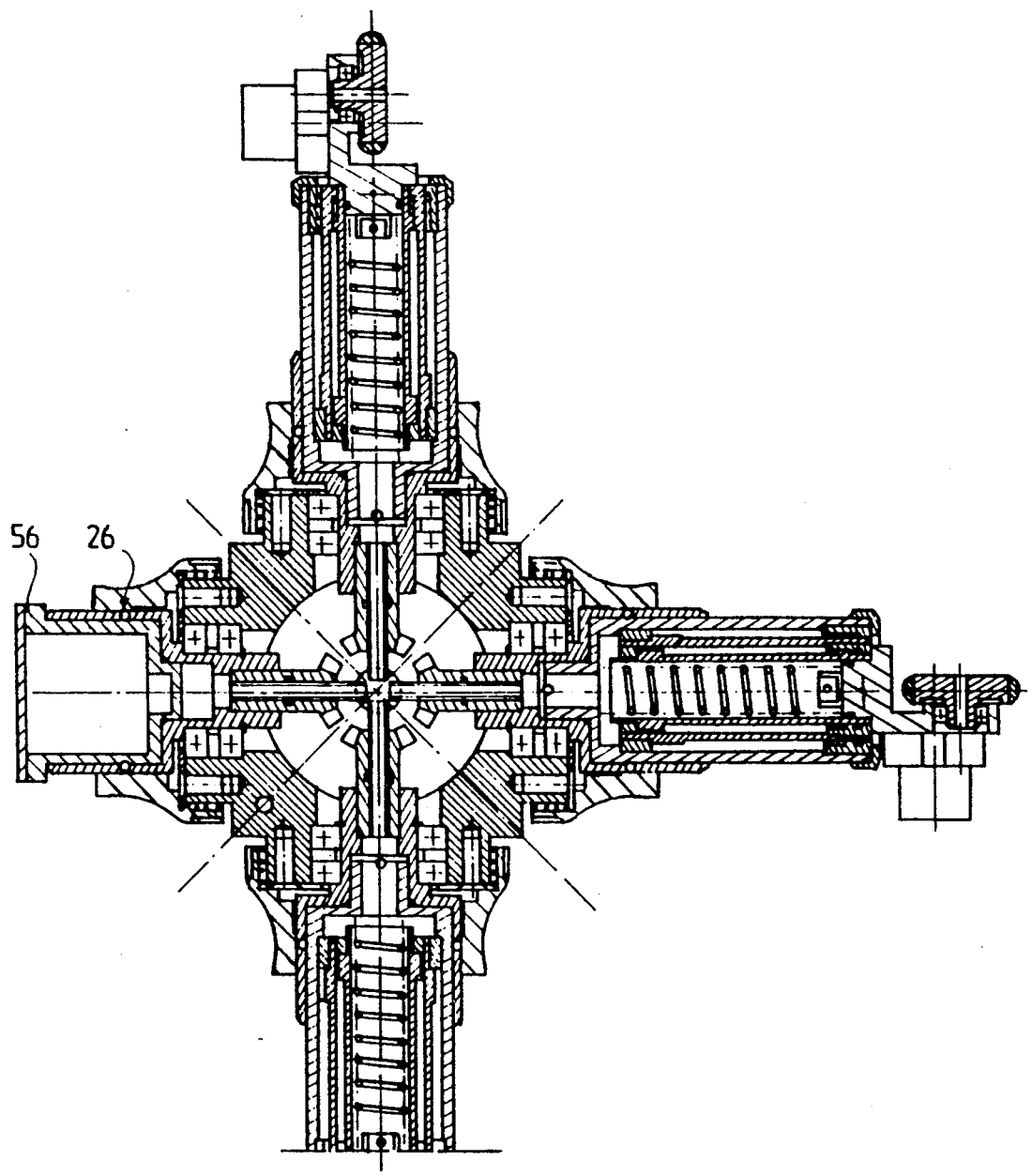
FIG. 6 is a cross-section of the body of the vehicle through the turret, showing an arrangement with four openings for jacks, one of which has been removed at the upper part with the opening closed.

The gearing 18 meshes with the bevel pinions 21 of the jacks, the gearing 18 being rigidly connected to a sleeve 22 pivoting in the rolling bearings 23 which ensure its rotation. The sleeve 22 has the shape, for example, of a hexagon 25 which allows rotational engagement with the bottom of the jack 29 but has a bearing surface 24 which ensures gastightness. The sleeve likewise has an indexing device with, in this example, balls 26 held in place by a sleeve 27 which is returned into the closed position by a spring 28, so that the jack 29 is linked in a translatory movement with the sleeve 22. The balls are placed in holes of the sleeve 22 and penetrate into a circular groove of trapezoidal cross section of the jack 29. Here, they are held in place by the sleeve 27 in order to ensure the engagement for the longitudinal translation between the jack 29 and the sleeve 22 and to receive the forces caused by the thrust of the gases. This arrangement allows the attachment and removal of the body of the jack 29 to and from from the turret to which the sleeve 22 is rigidly connected. The removal operation is accomplished by sliding the sleeve 27 upwards in this figure, compressing the spring 28, so that the ball can then emerge from the groove of the jack 29, thus allowing the removal of the jack 29 from the sleeve 22. This rapid disassembly allows jacks or legs/columns of different lengths to be installed, in particular in order to adapt them to the nearest of the diameters of the tubes in which the vehicle moves. The possibility of removing legs makes it possible to reduce the space requirement of the vehicle in order to pass it through narrow manholes when it is introduced into the tube. This rapid disassembly arrangement makes it also possible to deliberately use all the legs in the case of a specific mission, as shown in FIG. 6.

FIG. 3 shows an example of an arrangement for jacks with telescope rods. In this illustrative embodiment, the jack has two hollow rods 30 and 31. The rods 30 and 31 are rotatably linked to one another by a key 32, and to the jack 29. A tension spring 33 in the central axis of symmetry of the jack 29 is hooked on the one hand to the jack 29 by a hooking pin 34 and, on the other hand, by a pin 36 to the central rod 30 linked by a part 47 to the support means 48 bearing the elements which bring about the displacement of the vehicle. In this example, the support means 48 and the part 47 are rigidly connected and carry the driving elements. They are linked by a pin 37 to the rod 30. The pressure of the gases which arrive via the orifice 38 allows the rods to emerge from the jack, being balanced by the return force of the spring 33, and the rods can thus be partially extended and exert a variable force on the walls of the tube 1 according to the pressures exerted by the gas.

The pressurized gas arrives via the air supply 20 from the on-board compressor and feeds the distributors 39 which distribute the gas individually to each jack via 40 and 38. Leakproofness is ensured between the pinion 21 and the orifice 38 by a seal 41; the pinion 21 can thus rotate while the elements 40 and 38 connected to the distributor remain in a fixed position.

The rotation of the motor 17 and of its output shaft 19 connected to the gearing 18 simultaneously rotates the pinions 21 with the sleeve 22 and all the elements of the jack with the support means 48, this action allowing the elements for driving the vehicle to be steered.

FIG. 3 shows a driving arrangement employing endless belts. The support means 48 bears a geared motor linked in rotation to the that drives pulley 49 driving a belt 53. The belt 53 drives a roller 50 that drives an endless belt revolving between the rollers 50 and 51, tensioned by the roller 51 and supported by a roller 52. The rollers 50, 52, 51, that rotate in conjunction, pivot in the support means 48. An intermediate roller 52 supports the endless belt in order to prevent it from bending when encountering obstacles. The endless belt is arranged in such a way that its contact face with the obstacles is inclined relative to the surface of the wall 1 by an angle of about 45°. The endless belt 54 is in contact with the wall 1 over a surface limited by the curvature imparted to the endless belt by the roller 50. This localized contact between the endless belt and the suface of the tube in which it rolls permits a rotation of the support means 48 about the axis of the jack. In the case of a change of direction of the vehicle, the endless belt is capable of sliding on the wall since the extent of the contact is limited. According to a preferred arrangement, the endless belt is situated on one side of the jack and the motor driving the endless belt on the other side, remote from the wall, in order to avoid the obstacles which may be encountered.

FIG. 4 shows the arrangement of three jacks with wheels. The air supply is effected in the central part with the element 40 via three openings distributing the gas to each jack independently.

Figure 5:
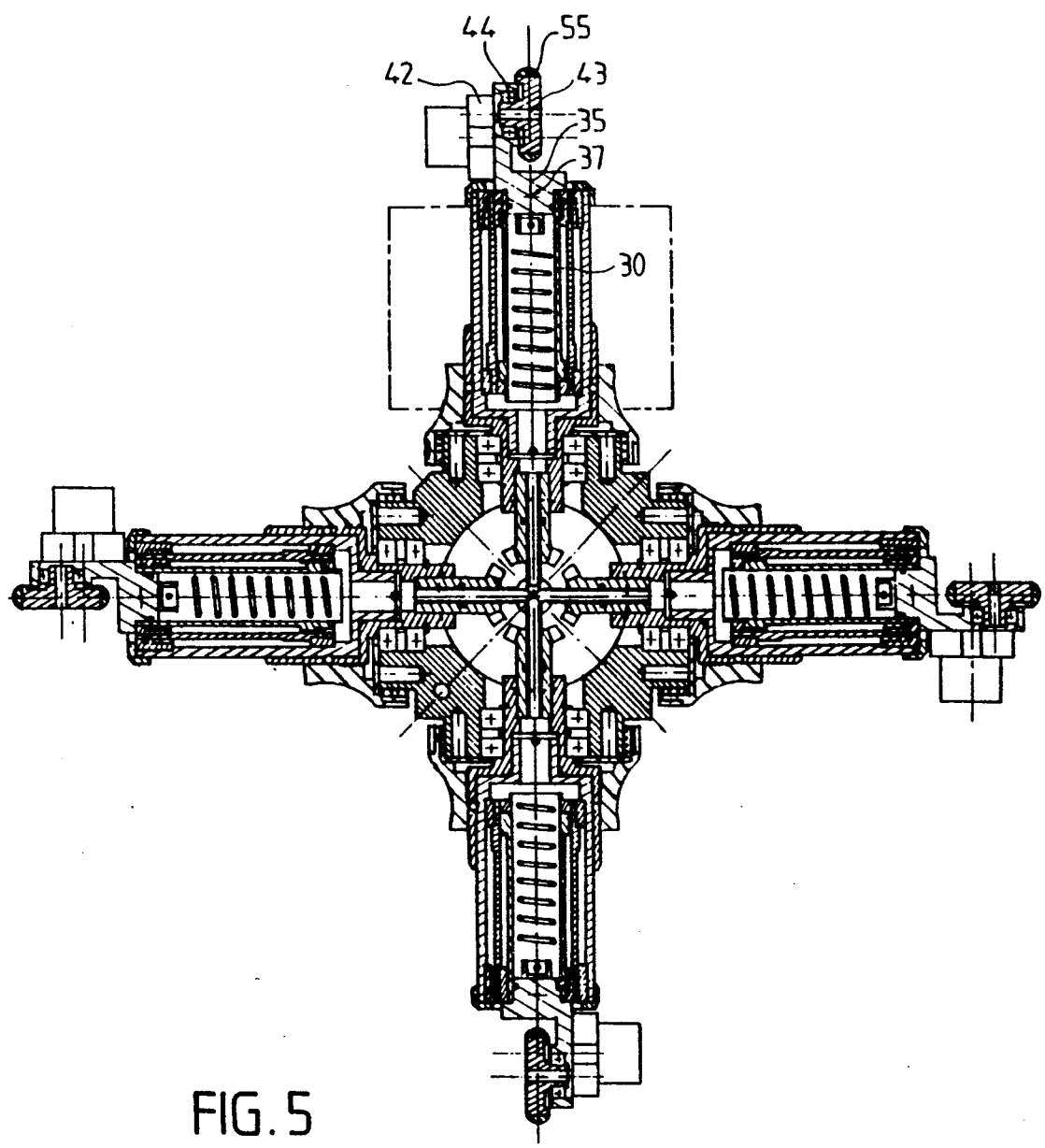
FIG. 5 is a cross-sectional view of the body of the vehicle through the turret, showing the arrangement with four jacks and with wheels.

FIG. 5 shows the arrangement of four jacks with wheels. The support means 35 bear the motorization elements. The support means 35 are interchangeable with those 47 described above which are linked to the jack rods 30 by the pin 37.

The mechanism permitting the rotation of the driving wheels is shown by this figure in the form of a particular embodiment. It is composed of a geared motor 42, on each leg, whereby the respective output shaft 43 is connected to the respective wheel 55 and rotates in a pivot 44 supported by the cap 35. The wheel overhangs relative to its pivot 44 in such a way that it is supported by its pivot on the side of the motor but it is completely unsupported on the other side in order to provide enough space to allow it to move away from obstacles which may be encountered on one side and facilitate the rotation of the wheels when facing these obstacles. FIG. 4 shows the arrangement of the vehicle in a tube 1 but also how this overhanging arrangement of the wheels allows rolling on a plane surface 45.

FIG. 6 shows a cross-section of the turret with an orifice where a jack has been removed. The orifice is closed by a plug 56 and held like the bodies of the jacks by a ball catch 26.

Figure 7:
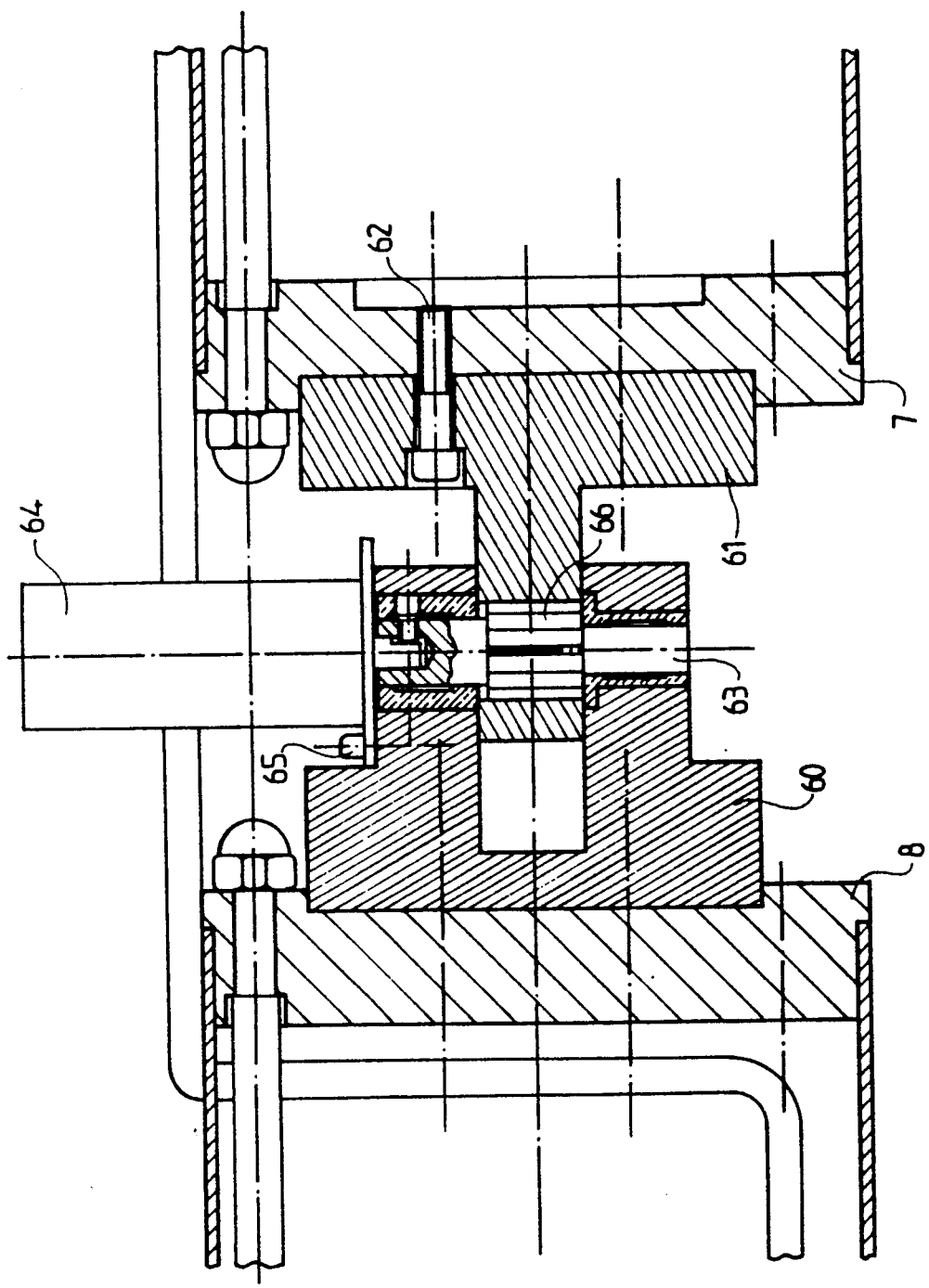
FIG. 7 is a cross-section of the body in the region of its central articulation.

FIG. 7 shows the central pivot in cross-section. This mechanism is implemented by means of a support means, one element 60 of which is rigidly connected to the rear frame 8. The other part 61 is rigidly connected to the front frame 7 by fixing means identical to 62. The shaft of the pivot is shown at 63. The central part of the shaft has splines 66, for example, which ensure the linkage in rotation with the part 61. The shaft 63 can pivot in the element 60 as shown in FIG. 7 and is linked in rotation with the geared motor 64; the geared motor 64 is fixed to the element 60 by means 65. The rotation of the part 61 relative to the element 60 can thus be ensured by the driving shaft 63, but the pivot is likewise reversible when the motor is not operated.

Figure 8:
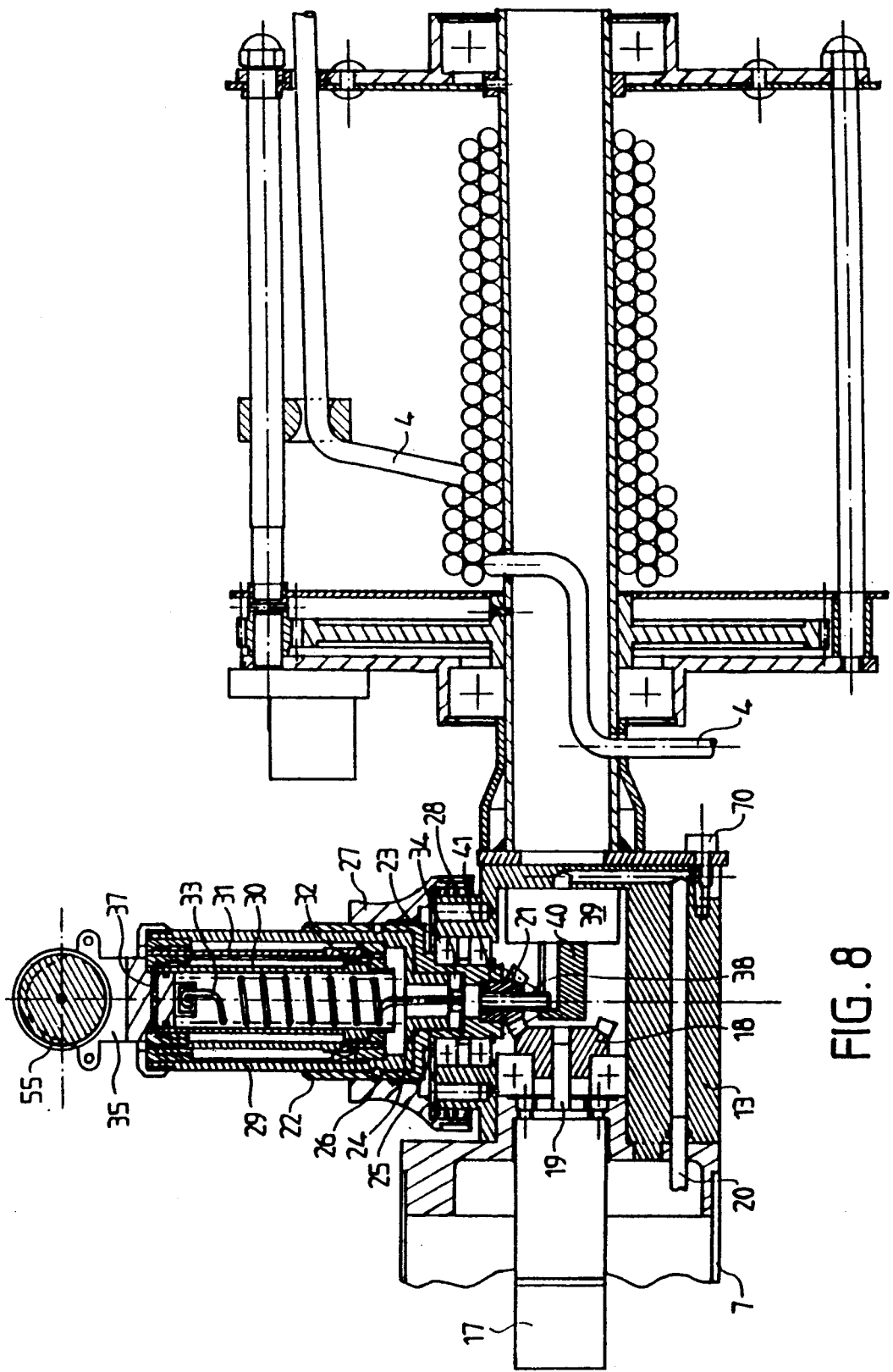
FIG. 8 is a longitudinal cross-section of the body of the vehicle in its rear part and showing a jack in cross-section and the winder for the umbilical cord.

FIG. 8 shows in a longitudinal section of the rear part of the vehicle, the winder for the umbilical cord 4 fixed by 70 on the rear turret 13.

The mechanism of the camera is shown in FIG. 3, allowing it to move in a rotary movement about the frame 7 and likewise in the plane passing via the longitudinal axis of the frame 7 for observations in the directions of this plane.

The present invention is, of course, in no way restricted to the specific disclosure of the specification and drawings, but also encompasses any modifications within the scope of the appended claims.

What is claimed is:

1. A self-propelled vehicle intended to move in a space of a pipe of an essentially circular cross-section and having an umbilical cord connected thereto, said vehicle comprising:

a central load-bearing structure, made of frame parts arranged adjacent to one another in a longitudinal direction of said vehicle;

jacks arranged in planes that are transverse to said longitudinal direction, with each of said jacks at a free end thereof having a driving means, whereby said driving means allow said vehicle to progress within the space by being pressed against an inner surface of the pipe; and each of said jacks being provided with hollow rods of different diameters that are disposed concentrically about a longitudinal axis of said jack, with said hollow rods being connected to one another and to said jack by a first means for rotating said jack together with said hollow rods about said longitudinal axis.

2. A self-propelled vehicle according to claim 1, wherein said driving means are wheels supported by respective support means fastened to said free ends.

3. A self-propelled vehicle according to claim 2, wherein each one of said wheels is supported by a pivot arranged on one side of said wheel.

4. A self-propelled vehicle according to claim 2, wherein a point of contact between a respective one of said wheels and said inner surface, said inner surface being perpendicular to said longitudinal axis of said jack, is in an extension of said longitudinal axis.

5. A self-propelled vehicle according to claim 2, wherein said jacks are telescopic and each have a respective central tension spring that is fastened to a bottom portion of said jack and to said support means.

6. A self-propelled vehicle according to claim 1, wherein said driving means are endless belts supported by a respective support means fastened to said free ends.

7. A self-propelled vehicle according to claim 6, wherein each one of said endless belts forms an inclined plane in direction of advance of said vehicle, and is guided around a roller arranged in an extension of a longitudinal axis of rotation of said jack.

8. A self-propelled vehicle according to claim 7, wherein said endless belt is driven by said roller, said roller being driven by a further driving means arranged on a side of said jack opposite said endless belt.

9. A self-propelled vehicle according to claim 1, wherein said frame parts are provided with turrets having openings for attaching said jacks.

10. A self-propelled vehicle according to claim 9, wherein each of said turrets has three of said openings.

11. A self-propelled vehicle according to claim 9, wherein each of said turrets has four of said openings.

12. A self-propelled vehicle according to claim 9, wherein each of said openings is provided with second means for rotating said jack, said second means for rotating comprising a sleeve, that engages a bottom portion of said jack.

13. A self-propelled vehicle according to claim 9, wherein said jacks of a respective one of said turrets are synchronously rotated by a bevel gear that is driven by a motor.

14. A self-propelled vehicle according to claim 9, wherein said jacks of a respective one of said turrets are supplied with gas by a distribution means via connecting means.

15. A self-propelled vehicle according to claim 9, wherein said jacks of a respective one of said turrets are arranged in opposing pairs, with longitudinal axes of a respective pair of said jacks being aligned relative to one another, and with said jacks of neighboring ones of said turrets being arranged such that axes of said jacks of a first one of said turrets are parallel to axes of said jacks of a second one of said turrets.

16. A self-propelled vehicle according to claim 1, wherein each one of said jacks has means for disassembling, said disassembling means comprising a first sleeve with recesses, said first sleeve being arranged at a bottom portion of said jack; balls that are inserted into said recesses and protrude into a circular groove of said jack; a second sleeve that is disposed concentrically over said first sleeve for holding said balls in place and is slidable in a longitudinal direction of said jack by compressing an elastic means, operatively connected to said second sleeve, for releasing said balls from said groove of said jack.

17. A self-propelled vehicle according to claim 16, wherein said first sleeve is closed by a plug.

18. A self-propelled vehicle according to claim 1, wherein said frame parts pivot relative to one another about a shaft that is parallel to longitudinal axes of said jacks.

19. A self-propelled vehicle according to claim 18, wherein said shaft is supported at a first support in a fixed manner and at a second support in a pivotable manner, with said first and second support being fixedly connected to a respective one of said frame parts, whereby said shaft is driven by a motor that is rigidly connected to said second support.

20. A self-propelled vehicle according to claim 1, wherein a first winding device for said umbilical cord is provided at said vehicle and a second winding device is provided outside the circular space.

* * * * *